United States Patent
McCormick et al.

(10) Patent No.: US 10,831,553 B2
(45) Date of Patent: Nov. 10, 2020

(54) SYSTEM AND METHOD FOR FAIR RESOURCE ALLOCATION

(71) Applicant: Huawei Technologies Co., Ltd., Shenzhen (CN)

(72) Inventors: William Carson McCormick, Ottawa (CA); Francis Patrick Kelly, Cambridge (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 15/589,175

(22) Filed: May 8, 2017

(65) Prior Publication Data

US 2018/0210765 A1 Jul. 26, 2018

Related U.S. Application Data

(60) Provisional application No. 62/449,355, filed on Jan. 23, 2017.

(51) Int. Cl.
  *G06F 9/50* (2006.01)
  *G06F 9/455* (2018.01)

(52) U.S. Cl.
  CPC ........ G06F 9/5077 (2013.01); G06F 9/45504 (2013.01)

(58) Field of Classification Search
  CPC ..... H04L 41/12; H04L 41/0893; H04L 41/20; H04L 43/0876; H04L 45/586; H04L 47/127; H04W 16/04
  See application file for complete search history.

(56) References Cited

U.S. PATENT DOCUMENTS

| | | | | |
|---|---|---|---|---|
| 2011/0292886 A1* | 12/2011 | Lee | ........... | H04W 16/04 370/329 |
| 2013/0201830 A1* | 8/2013 | Wang | ........... | H04W 4/70 370/235 |
| 2014/0307556 A1* | 10/2014 | Zhang | ........... | H04L 45/302 370/236 |
| 2014/0362730 A1* | 12/2014 | Zhang | ........... | H04L 45/64 370/254 |

(Continued)

FOREIGN PATENT DOCUMENTS

WO  2014205458 A2  12/2014

OTHER PUBLICATIONS

Emilie Danna; A practical algorithm for balancing the max-min fairness and throughput objectives in traffic engineering; 2012; (Year: 2012).*

(Continued)

*Primary Examiner* — Dong U Kim
(74) *Attorney, Agent, or Firm* — Slater Matsil, LLP

(57) ABSTRACT

A system and method for fair resource allocation includes a method. The method includes determining demand for a plurality of communications features of a network. The method further includes determining resource allocations for virtual computing instances hosted by a plurality of servers. The virtual computing instances serve the communications features. The method further includes adjusting the resource allocations for the virtual computing instances according to the demand for the communications features and a fairness algorithm.

23 Claims, 5 Drawing Sheets

(56) References Cited

U.S. PATENT DOCUMENTS

| | | | | |
|---|---|---|---|---|
| 2014/0376383 | A1* | 12/2014 | McCormick | H04L 47/2441 |
| | | | | 370/238 |
| 2015/0063166 | A1* | 3/2015 | Sif | G06F 9/45558 |
| | | | | 370/254 |
| 2016/0014787 | A1* | 1/2016 | Zhang | H04W 4/70 |
| | | | | 370/329 |
| 2016/0072704 | A1 | 3/2016 | Angel et al. | |
| 2016/0119246 | A1 | 4/2016 | Wang | |
| 2016/0218948 | A1* | 7/2016 | Djukic | H04L 43/0876 |
| 2018/0359044 | A1* | 12/2018 | Pirskanen | H04J 11/0069 |

OTHER PUBLICATIONS

"Auto Scaling," https://aws.amazon.com/autoscaling/, downloaded Oct. 10, 2017, Amazon Web Services, Inc., 2017, 4 pages.

"What Is Amazon EC2?—Amazon Elastic Compute Cloud," http://docs.aws.amazon.com/AWSEC2/latest/UserGuide/concepts.html, downloaded Oct. 10, 2017, Amazon Web Services, Inc., 2017, 6 pages.

Hagen, M., "Fairness in a Data Center," Ph.D. Dissertation, University of New Hampshire, Durham, NH, AAI3537816, Dec. 2012, 164 pages.

Lozi, et al., "The Linux Scheduler: a Decade of Wasted Cores," EuroSys '16, Apr. 18-21, 2016, London, UK, ACM 978-1-4503-4240—Jul. 16, 2004, https://www.ece.ubc.ca/~sasha/papers/eurosys16-final29.pdf, 16 pages.

* cited by examiner

SYSTEM AND METHOD FOR FAIR RESOURCE ALLOCATION

PRIORITY CLAIM AND CROSS-REFERENCE TO RELATED APPLICATIONS

This application claims the benefit of U.S. Provisional Application No. 62/449,355, filed on Jan. 23, 2017, which application is hereby incorporated herein by reference.

TECHNICAL FIELD

The present invention relates generally to systems and methods for resource allocation, and, in particular embodiments, to a system and method for fair resource allocation.

BACKGROUND

Fifth Generation (5G) wireless networks may represent a major paradigm shift from previous wireless networks. For example, 5G wireless networks may utilize high carrier frequencies with unprecedented numbers of antennas. Moreover, the topology of 5G wireless networks may be defined by logical links between virtualized nodes, and not by the physical locations of nodes and the links that interconnect them. Software Defined Topology (SDT), along with other technologies such as Software Defined Networking (SDN) and Network Function Virtualization (NFV), is considered an enabling technology for the dynamic creation and management of networks. In 5G wireless networks, SDT may be used to divide the network into end-to-end virtual networks, or network "slices." Different slices may have different capabilities or latencies for accommodating different types of network services. Virtualized computing may be used to address the computing needs of virtual networking.

SUMMARY

According to one aspect of the present disclosure, there is provided a method that includes: determining demand for a plurality of communications features of a network; determining resource allocations for virtual computing instances hosted by a plurality of servers, the virtual computing instances serving the communications features; and adjusting the resource allocations for the virtual computing instances according to the demand for the communications features and a fairness algorithm.

Optionally, in any of the preceding aspects, another implementation of the aspect provides that the fairness algorithm is a max-min fairness algorithm.

Optionally, in any of the preceding aspects, another implementation of the aspect provides that the fairness algorithm is an alpha fairness algorithm.

Optionally, in any of the preceding aspects, another implementation of the aspect provides that the fairness algorithm is a proportional fairness algorithm.

Optionally, in any of the preceding aspects, another implementation of the aspect provides that the communications features of the network are a plurality of slices for end-to-end partitions of the network, each of the slices having a weight.

Optionally, in any of the preceding aspects, another implementation of the aspect provides that the virtual computing instances virtualize networking functionality for the network.

Optionally, in any of the preceding aspects, another implementation of the aspect provides that the resource allocations for each of the virtual computing instances are determined for each of the slices according to: max $\Sigma_s w_s \log(X_s)$, and $\Sigma_{s \in j} X_s \leq C_j$, wherein $X_s$ indicates the resource allocations for each of the slices, $w_s$ is the weight of each of the slices, and $C_j$ is the capacity of the server hosting the computing instance.

Optionally, in any of the preceding aspects, another implementation of the aspect provides that the method further includes: determining weights for the plurality of communications features of the network, where the resource allocations for the virtual computing instances are further adjusted according to the weights of the communications features.

Optionally, in any of the preceding aspects, another implementation of the aspect provides that the method further includes: adjusting the weights of the communications features according to placement of the communications features on the servers.

Optionally, in any of the preceding aspects, another implementation of the aspect provides that adjusting the resource allocations for the virtual computing instances further includes: optimizing the resource allocations for each of the servers.

According to one aspect of the present disclosure, there is provided a device that includes: a processor; and a non-transitory computer readable storage medium storing programming for execution by the processor, the programming including instructions for: determining demand for a plurality of communications features of a network; determining resource allocations for virtual computing instances hosted by a plurality of servers, the virtual computing instances serving the communications features; and adjusting the resource allocations for the virtual computing instances according to demand for the communications features and a fairness algorithm.

Optionally, in any of the preceding aspects, another implementation of the aspect provides that the fairness algorithm is a max-min fairness algorithm.

Optionally, in any of the preceding aspects, another implementation of the aspect provides that the fairness algorithm is an alpha fairness algorithm.

Optionally, in any of the preceding aspects, another implementation of the aspect provides that the fairness algorithm is a proportional fairness algorithm.

Optionally, in any of the preceding aspects, another implementation of the aspect provides that the communications features of the network are a plurality of slices for end-to-end partitions of the network, each of the slices having a weight.

Optionally, in any of the preceding aspects, another implementation of the aspect provides that the virtual computing instances virtualize networking functionality for the network.

Optionally, in any of the preceding aspects, another implementation of the aspect provides that the resource allocations for each of the virtual computing instances are determined for each of the slices according to: max $\Sigma_s w_s \log(X_s)$, and $\Sigma_{s \in j} X_s \leq C_j$, wherein $X_s$ indicates the resource allocations for each of the slices, $w_s$ is the weight of each of the slices, and $C_j$ is the capacity of the server hosting the computing instance.

Optionally, in any of the preceding aspects, another implementation of the aspect provides that the programming includes further instructions for: determining weights for the plurality of communications features of the network, wherein the resource allocations for the virtual computing instances are further adjusted according to the weights of the communications features.

Optionally, in any of the preceding aspects, another implementation of the aspect provides that the programming includes further instructions for: adjusting the weights of the communications features according to placement of the communications features on the servers.

Optionally, in any of the preceding aspects, another implementation of the aspect provides that adjusting the resource allocations for the virtual computing instances further comprises: optimizing the resource allocations for each of the servers.

According to one aspect of the present disclosure, there is provided a method that includes: determining parameters for a plurality of slices of a network, the slices being logical end-to-end partitions of the network; placing the slices on a plurality of servers, each of the servers having a plurality of computing instances, each of the computing instances assigned to one of the slices; and allocating resources for the computing instances according to the parameters and a scheme that is fair to each of the slices.

Optionally, in any of the preceding aspects, another implementation of the aspect provides that the method further includes: creating the computing instances on the servers with the allocated resources.

Optionally, in any of the preceding aspects, another implementation of the aspect provides that the method further includes: adjusting the resources allocated to the computing instances according to the scheme in response to traffic loads of the slices varying.

According to one aspect of the present disclosure, there is provided a device that includes: a processor; and a non-transitory computer readable storage medium storing programming for execution by the processor, the programming including instructions for: determining parameters for a plurality of slices of a network, the slices being logical end-to-end partitions of the network; placing the slices on a plurality of servers, each of the servers having a plurality of computing instances, each of the computing instances assigned to one of the slices; and allocating resources for the computing instances according to the parameters and a scheme that is fair to each of the slices.

Optionally, in any of the preceding aspects, another implementation of the aspect provides that the programming further includes instructions for: creating the computing instances on the servers with the allocated resources.

Optionally, in any of the preceding aspects, another implementation of the aspect provides that the programming further includes instructions for: adjusting the resources allocated to the computing instances according to the scheme in response to traffic loads of the slices varying.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
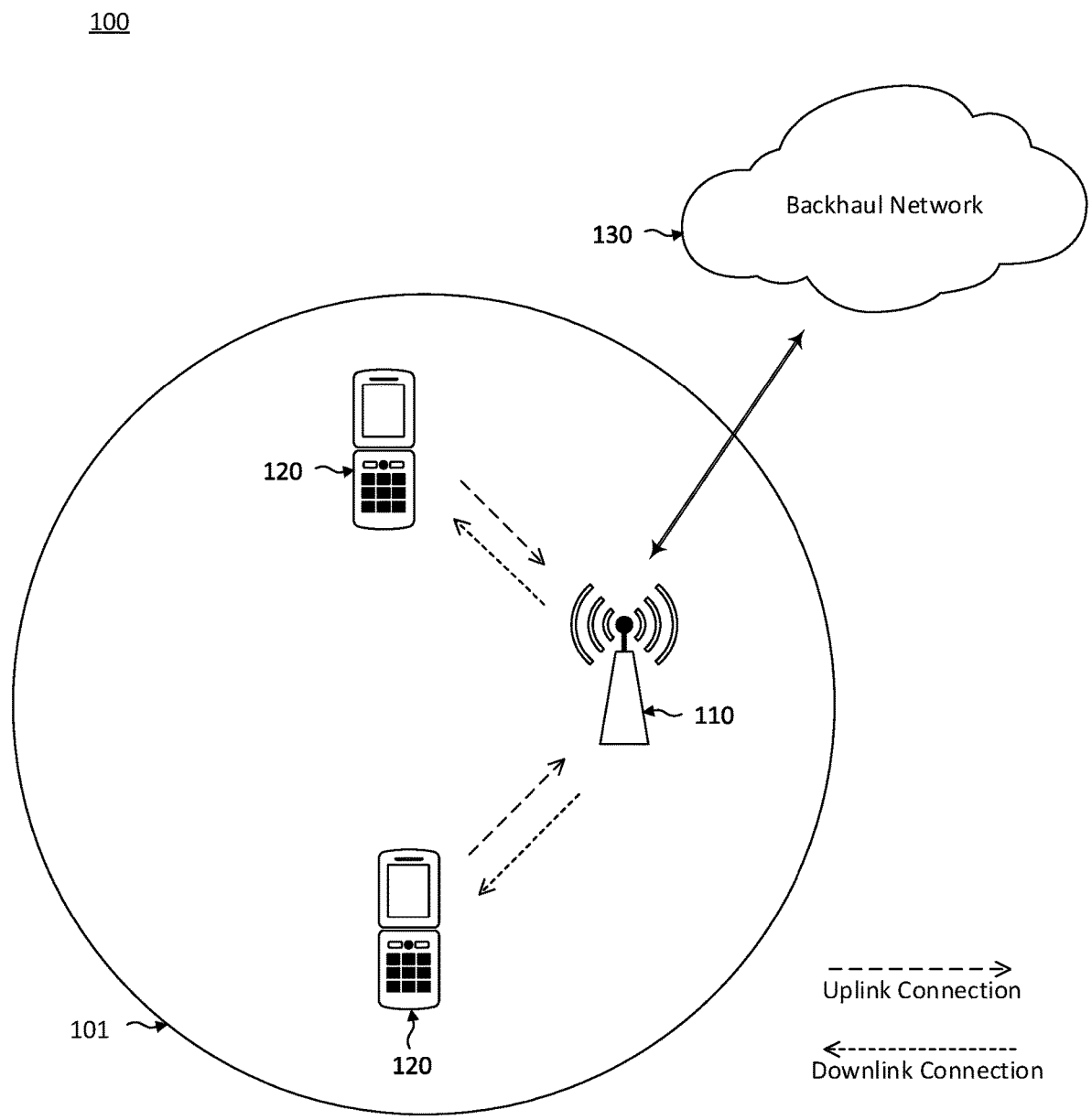
FIG. 1 is a diagram of a network, according to an embodiment.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

For 5G wireless networks, processing may be performed in a data center. For example, some types of processing that were performed in the baseband for 3G and LTE networks may instead be performed in a data center for 5G networks. A 5G network may be partitioned into multiple logical end-to-end network slices. Each of the slices may carry traffic for a network service. To address scaling issues, servers in a data center may be virtualized to have different instances or containers hosted on the servers. The different computing instances may be assigned to different slices, and handle traffic for those slices. The total amount of resources available to all computing instances may be fixed based on the quantity of servers in the data center, and the amount of virtual computing capacity needed for each slice may vary based on the conditions and traffic loads of the slices. Because traffic for a network service (e.g., in a slice) is a continuous "stream" or "flow," and is not transactional, adjusting the virtual computing capacity for each slice may disrupt network traffic if the adjustment includes taking the computing instances offline.

A system and method for fair resource allocation is provided, according to various embodiments. In particular, the resources of the data center assigned to the different computing instances are adjusted with a fairness scheme based on the conditions and traffic loads of the slices. Each slice has a weight, and in some embodiments, the fairness scheme is a weighted fairness scheme where the amount of resources assigned to the computing instances for a slice are varied according to the weight of the slice. Resources are assigned to the computing instances for the slices in a fair manner. For example, if the traffic load of a higher priority slice increases, then the amount of resources assigned to the computing instances for a lower priority slice may be decreased so that those resources may be reassigned to the computing instances for the higher priority slice. This operation may be referred to as "shrinking" the computing instances for the lower priority slice and "growing" the computing instances for the higher priority slice. The computing instances may be grown or shrunk dynamically such that the computing instances remain online while they are grown or shrunk, and may be changed in response to traffic loads of the slices varying.

Embodiments may achieve advantages. Growing and shrinking existing computing instances for the slices may result in a smoother transition when adjusting the resources assigned to each slice. This may avoid disruption of the traffic flows in the slices that may occur when creating new computing instances for higher priority slices and/or terminating computing instances of lower priority slices.

It should be appreciated that the term "slice," as used herein, may include all communications features related to providing an end-to-end network slice. For example, such communications features may include core network nodes, virtual network functions, software-defined networking, and the like. Adjusting the resources assigned to a slice may include adjusting the resources assigned to the communications features that provide that slice.

Further, although various embodiments are described herein as adjusting the resources assigned to a slice based on traffic load of the slice, it should be appreciated that embodiment techniques could be used to adjust resources for any communications features provided by a virtualized datacenter. In other embodiments, the computing instances may provide communications features for network caching; content distribution; general purpose servers such as database, web, and application servers; and the like.

FIG. 1 is a diagram of a network 100 for communicating data, according to an embodiment. The network 100 comprises a base station no having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

The backhaul network 130 may include, e.g., the data center. According to an embodiment, SDT is used to divide the backhaul network 130 into end-to-end slices for various services or flows of traffic in the network 100. There may be one slice or a plurality of slices. For example, a first slice (e.g., a high priority slice) may carry a first traffic flow for a first network service used by a first one of the mobile devices 120, and a second slice (e.g., a low priority slice) may carry a second traffic flow for a second network service used by a second one of the mobile devices 120. Some or all of the backhaul network 130 may be located in a data center, and the servers in the data center are divided into multiple computing instances that are assigned to the different slices.

The resources assigned to the computing instances in the data center may change according to the conditions and traffic loads of the slices. However, because the resources available to the data center are fixed, changing the resources assigned to the computing instances may present a zero-sum problem. That is, allocating more resources to the computing instances for a first slice may require deallocating resources from the computing instances for a second slice. When changing resource allocations, the total amount of computing instances in the data center is not changed. That is, according to some embodiments, computing instances are not created or terminated when changing the resource allocations for the slices. Rather, the existing computing instances for those slices are grown or shrunk. For example, the amount of processor threads, memory, storage space, or the like assigned to the computing instances may be changed. The growing and shrinking of slices may be done on a per-server basis, where the computing instances on each server are adjusted.

Creating or terminating computing instances may disrupt the flow of traffic for slices, and creating new computing instances for the slices may be slow. Growing or shrinking the computing instances for each slice by changing the resources allocated to each computing instance may avoid problems associated with first-come-first-served creation and termination of computing instances. When changing resource allocations by creating or terminating computing instances in first-come-first-served schemes, the first slice created typically consumes many or all resources available to the data center. When further slices are created, new computing instances for the new slices are needed; in first-come-first-served schemes, resources for the new computing instances may be acquired by terminating the existing computing instances for the first slice and creating new, smaller computing instances for the first slice. Creating or terminating computing instances for a slice when the slice is already experiencing traffic, e.g., with an admission control scheme, may slow down the traffic on the slice or may exacerbate slow traffic for the slice. Growing or shrinking the computing instances to obtain resources for a slice may reduce these traffic disruptions.

In some embodiments, the locations or placement of the slices on the servers in the data center may be periodically changed. In such embodiments, computing instances may be created or terminated during the regularly scheduled changes. The computing instances assigned to the slices may be adjusted between the periodic relocations of the slices.

In some embodiments, the resources are assigned to the computing instances for the slices according to a fair resource allocation scheme or algorithm when growing or shrinking the computing instances for the slices. The fair resource allocation scheme may be, e.g., a proportionally fair scheme, an alpha fairness scheme, a min-max fairness scheme, or the like. In some embodiments, the fairness scheme is a weighted fairness scheme, where resources are allocated according to the weights assigned to each slice on each server. For example, the fair resource allocation scheme may be a weighted proportional fairness scheme, a weighted alpha fairness scheme, or a weighted max-min fairness scheme. The definition or solution of a weighted fairness scheme were the weights of each slice are equal may be reduced to the definition or solution for an unweighted fairness scheme. In embodiments where a weighted proportionally fair scheme is used, the allocation assignments may be determined according to:

$$\max \Sigma_s w_s \log(X_s), \text{ and} \quad (1)$$

$$\Sigma_{s \in j} X_s \leq C_j, \quad (2)$$

where $X_s$ is the allocation assignment for a slice s, $w_s$ is the weight of the slice s, and $C_j$ is the processing capacity of a server j. The weighted proportionally fair resource allocation solution may be determined by solving equations (1) and (2) for $X_s$. The fair resource allocation scheme may also consider placement of the slices. The fair resource allocation scheme may only adjust computing instances for a particular server.

The fair resource allocation scheme may be implemented with software, or with a dedicated hardware accelerator. A manager, such as a SDT manager, may monitor the computing instances in the data center. The manager may be software executing on a server or a computing instance in the data center. The manager may observe the network traffic loads of the slices, and determine that the computing instances for some slices should be grown or shrunk in response to changing traffic loads. If the resources allocated to the computing instances should be changed, the manager may compute the new resource allocations according to the fair resource allocation scheme. In embodiments where the scheme is implemented in software, the manager itself may solve equations (1) and (2) for $X_s$. In embodiments where the scheme is implemented in hardware, the hardware accelerator may be a device that is accessible by the manager, and the hardware accelerator may solve equations (1) and (2) for $X_s$. The hardware accelerator may be implemented with a device such as a field programmable gate array (FPGA), an application-specific integrated circuit (ASIC), a general-purpose computing on graphics processing unit (GPGPU), or the like. The hardware accelerator and the SDT manager may be different devices, or may include different processors.

Figure 2:
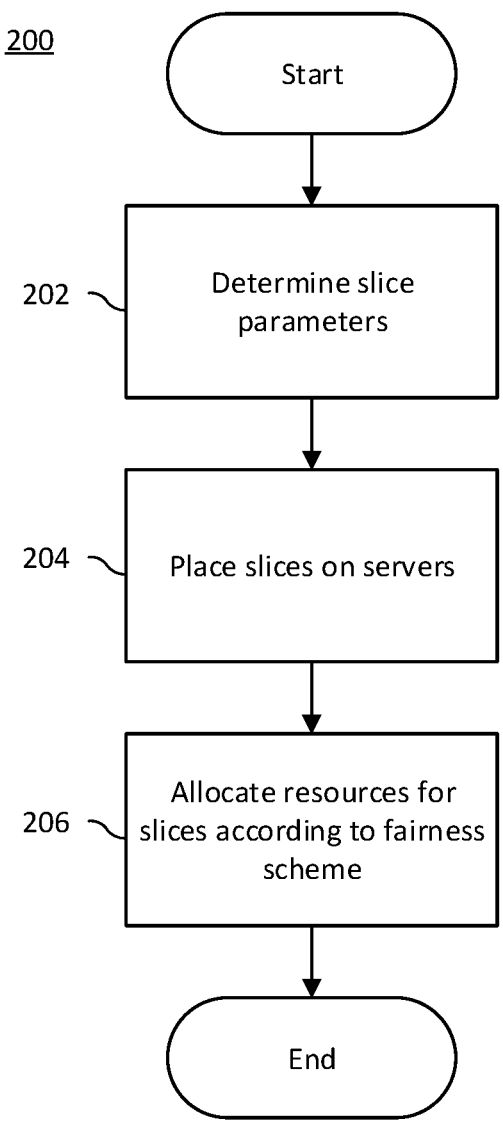
FIG. 2 is a flow diagram of a slice resource allocation method, according to an embodiment.

FIG. 2 is a flow diagram of a slice resource allocation method 200, according to an embodiment. The slice resource allocation method 200 may be indicative of operations performed by a SDT manager when creating computing instances for one or more slices. Parameters are determined for the slices (step 202). The parameters may include, e.g., the processing resources needed to handle the traffic flows in the slices, the delay requirements for the slices, etc. The parameters may vary for the different slices. For example, a first one of the slices may be for a high-priority network service and have more stringent latency needs, and a second one of the slices may be for a low-priority network service and have more relaxed latency needs. The slices are placed on the servers of the data center (step 204). As used herein, "placing" the slices includes determining which server(s) of the data center the slices should run on, and creating virtual computing instance(s) on those servers(s) for the slices. Resources are allocated to the computing instances for the slices according to a fairness scheme (step 206). The fairness scheme may be, e.g., a proportional fairness scheme, an alpha fairness scheme, a min-max fairness scheme, or the like. As noted above, the fairness scheme may be weighted or unweighted. In embodiments where the fairness scheme is weighted, resources are also allocated according to the weights assigned to the slices. The result of the fairness scheme determines how many resources of each server should be assigned to the computing instances for the different slices placed on the server. In embodiments where the fairness scheme is implemented in software, the processor executing the SDT manager may also perform the calculations for the fairness scheme (e.g., solve for $X_s$). In embodiments where the fairness scheme is implemented in hardware, the SDT manager may pass parameters needed to the hardware accelerator, the hardware accelerator may perform the calculations for the fairness scheme, and the SDT manager many obtain the results from the hardware accelerator. The resources of each server are then allocated to the different slices according to the result of the fairness scheme.

Figure 3:
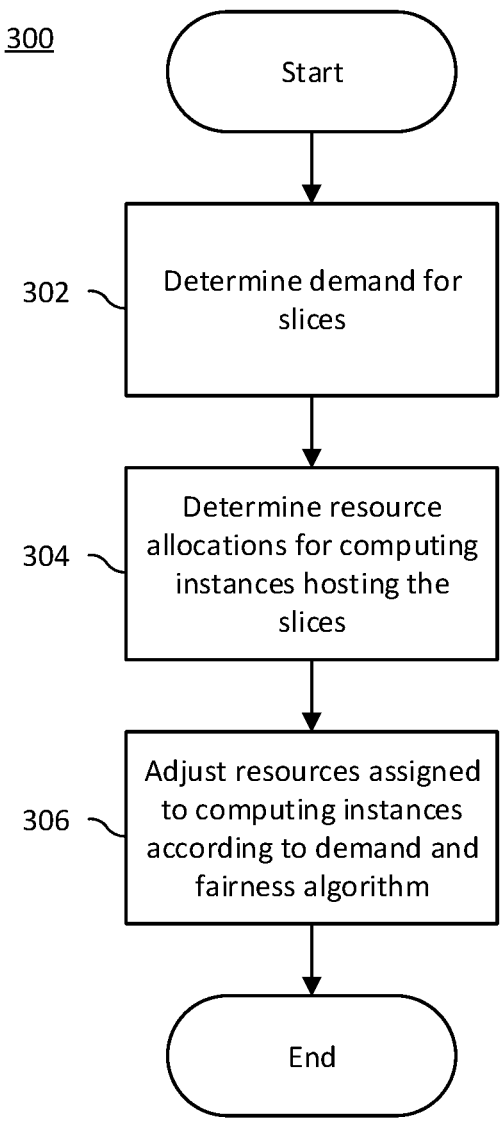
FIG. 3 is a flow diagram of a slice resource adjustment method, according to an embodiment.

FIG. 3 is a flow diagram of a slice resource adjustment method 300, according to an embodiment. The slice resource adjustment method 300 may be indicative of operations performed by a SDT manager when adjusting resources assigned to computing instances for one or more slices. The demand for the slices is determined (step 302). For example, the traffic conditions of the slice, such as the amount of traffic flowing or streaming in the slice, may be evaluated. The resources allocated to the computing instances for the slices are determined (step 304). The resources assigned to the computing instances for the slices are adjusted according to the demand and a fairness algorithm (step 306). In particular, the resources assigned to the computing instances hosting the communications features for the slice (e.g., core network nodes, virtual network functions, software-defined networking, and the like) are adjusted. Adjusting according to fairness algorithm may include using, e.g., a proportional fairness scheme, an alpha fairness scheme, a min-max fairness scheme, or the like. Adjusting may include shrinking the computing instances for a first slice on one or more servers, and growing the computing instances for a second slice on the one or more servers. In embodiments where a weighted fairness scheme is used, the weighted fairness algorithm also considers the weights assigned to each slice on each server. In such embodiments, the weights of the slices may also be determined (e.g., in step 302), and the resources assigned to the computing instances for the slices are also adjusted according to the weights of the slices (e.g., in step 306).

Figure 4A:
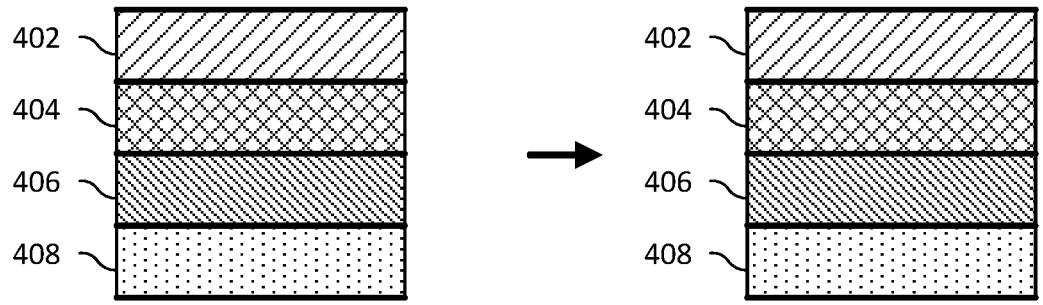
FIGS. 4A, 4B, and 4C are block diagrams illustrating changes in resource assignments, according to an embodiment.
Figure 4B:
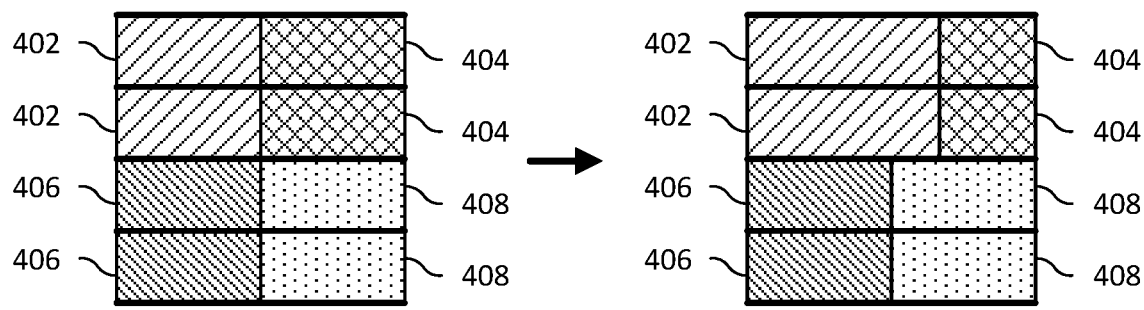
Figure 4C:
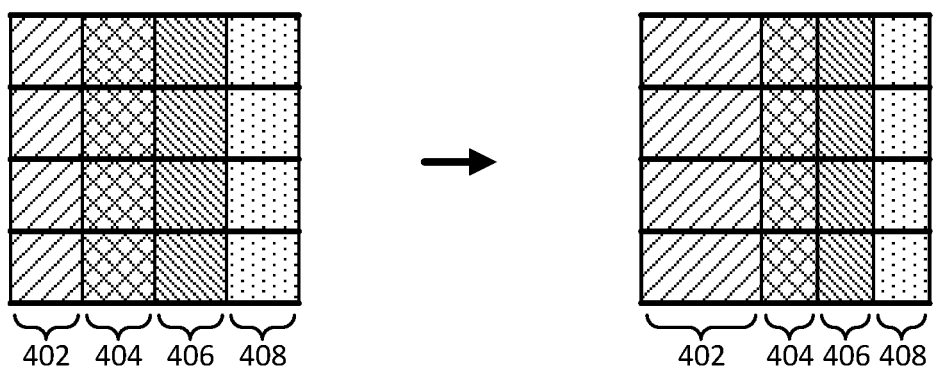

FIGS. 4A, 4B, and 4C are block diagrams illustrating changes in resource assignments for one or more slices, according to an embodiment. The groups of boxes in FIGS. 4A, 4B, and 4C each illustrate a data center. The horizontal lines in the boxes delineate different servers in the data center. The vertical lines in each server block delineate computing instances that have been created for slices 402, 404, 406, and 408 on the respective server. FIGS. 4A, 4B, and 4C each illustrate different placements of the slices on the servers. The left hand side of FIGS. 4A, 4B, and 4C illustrates the server resources allocated to the computing instances before an adjustment, and the right hand side of FIGS. 4A, 4B, and 4C illustrates the server resources allocated to the computing instances after attempting to increase the resources assigned to slice 402 in a manner that is fair to the slices 404, 406, and 408. Notably, in each of FIGS. 4A, 4B, and 4C, no computing instances are created or terminated. In the illustrated embodiment, the resources assigned to slice 402 may be adjusted by increasing the weight of slice 402. In some embodiments, the resource assignments may be adjusted by decreasing the weights of slices 404, 406, and 408.

In FIG. 4A, each of the slices 402, 404, 406, and 408 are located on different servers. As such, there is no change in their resource assignments, because there are no additional resources on each server to give to the computing instances for the slices when the weight of slice 402 is increased.

In FIG. 4B, the slices 402 and 404 are located across two servers, and the slices 406 and 408 are located across two different servers. As such, when the weight of slice 402 is increased, the resources assigned to the computing instances for the slice 402 are increased, and the resources assigned to the computing instances for the slice 404 are decreased. The slices 406 and 408 are not changed because they are located on different servers In FIG. 4C, the slices 402, 404, 406, and 408 are located across four servers. As such, when the weight of slice 402 is increase, the resources assigned to the computing instances for the slice 402 are increased, and the resources assigned to the computing instances for the slices 404, 406, and 408 are decreased.

Figure 5:
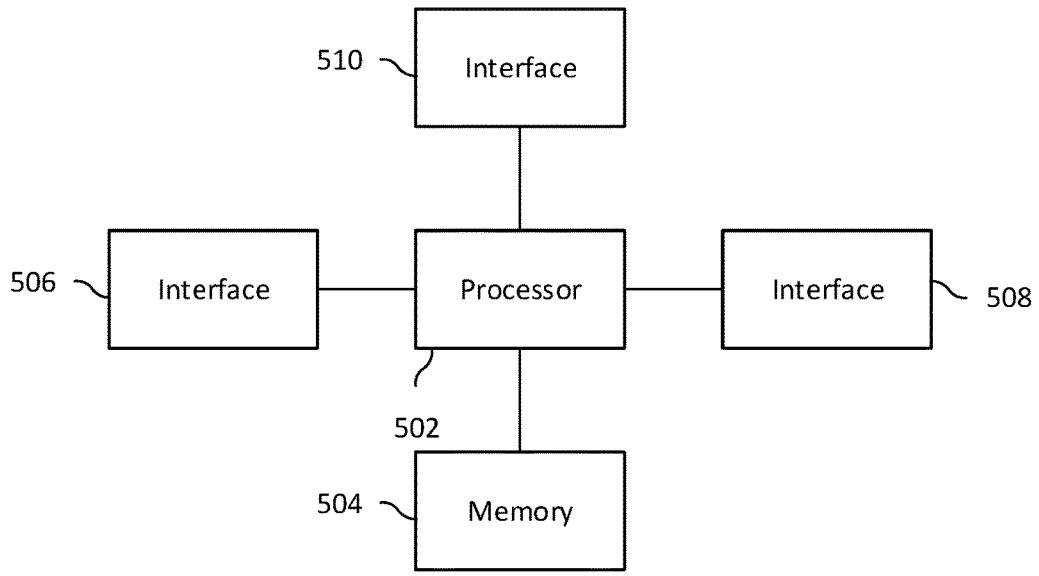
FIG. 5 is a block diagram of a processing system, according to an embodiment.

FIG. 5 is a block diagram of a processing system 500 for performing methods described herein, which may be installed in a host device, according to an embodiment. As shown, the processing system 500 includes a processor 502, a memory 504, and interfaces 506-510, which may (or may not) be arranged as shown in FIG. 5. The processor 502 may be any component or collection of components adapted to perform computations and/or other processing related tasks, and the memory 504 may be any component or collection of components adapted to store programming and/or instructions for execution by the processor 502. In an embodiment, the memory 504 includes a non-transitory computer readable medium. The interfaces 506, 508, 510 may be any component or collection of components that allow the processing system 500 to communicate with other devices/components and/or a user. For example, one or more of the interfaces 506, 508, 510 may be adapted to communicate data, control, or management messages from the processor 502 to applications installed on the host device and/or a remote device. As another example, one or more of the interfaces 506, 508, 510 may be adapted to allow a user or user device (e.g., personal computer (PC), etc.) to interact/communicate with the processing system 500. The processing system 500 may include additional components not depicted in FIG. 5, such as long term storage (e.g., non-volatile memory, etc.).

In some embodiments, the processing system 500 is included in a network device that is accessing, or part otherwise of, a telecommunications network. In one example, the processing system 500 is in a network-side device in a wireless or wireline telecommunications network, such as a base station, a relay station, a scheduler, a controller, a gateway, a router, an applications server, or any other device in the telecommunications network. In other embodiments, the processing system 500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 6:
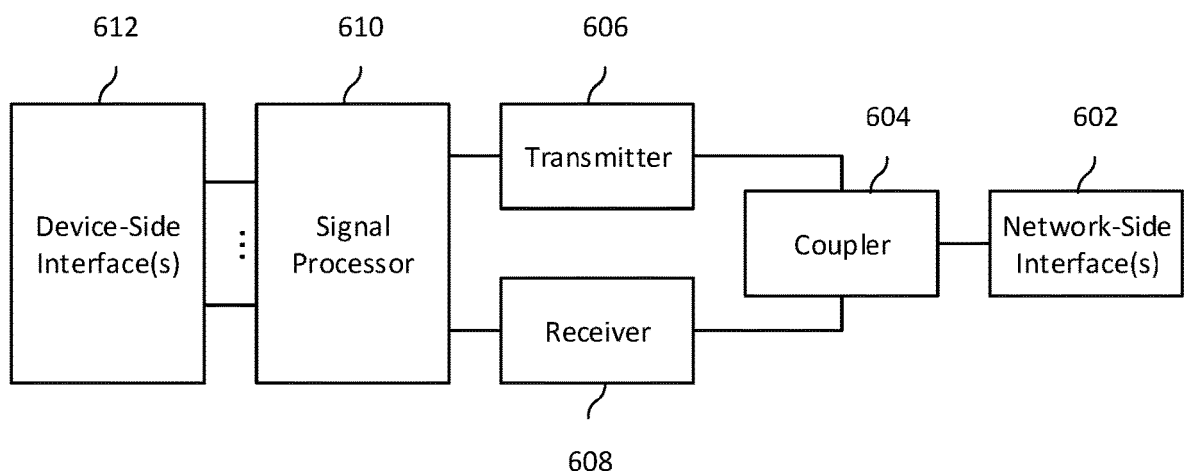
FIG. 6 is a block diagram of a transceiver, according to an embodiment.

In some embodiments, one or more of the interfaces 506, 508, 510 connects the processing system 500 to a transceiver adapted to transmit and receive signaling over the telecommunications network. FIG. 6 is a block diagram of a transceiver 600 adapted to transmit and receive signaling over a telecommunications network, according to an embodiment. The transceiver 600 may be installed in a host device. As shown, the transceiver 600 comprises a network-side interface 602, a coupler 604, a transmitter 606, a receiver 608, a signal processor 610, and a device-side interface 612. The network-side interface 602 may include any component or collection of components adapted to transmit or receive signaling over a wireless or wireline telecommunications network. The coupler 604 may include any component or collection of components adapted to facilitate bi-directional communication over the network-side interface 602. The transmitter 606 may include any component or collection of components (e.g., up-converter, power amplifier, etc.) adapted to convert a baseband signal into a modulated carrier signal suitable for transmission over the network-side interface 602. The receiver 608 may include any component or collection of components (e.g., down-converter, low noise amplifier, etc.) adapted to convert a carrier signal received over the network-side interface 602 into a baseband signal. The signal processor 610 may include any component or collection of components adapted to convert a baseband signal into a data signal suitable for communication over the device-side interface(s) 612, or vice-versa. The device-side interface(s) 612 may include any component or collection of components adapted to communicate data-signals between the signal processor 610 and components within the host device (e.g., the processing system 500, local area network (LAN) ports, etc.).

The transceiver 600 may transmit and receive signaling over any type of communications medium. In some embodiments, the transceiver 600 transmits and receives signaling over a wireless medium. For example, the transceiver 600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 602 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, an adjusting unit/module, an optimizing unit/module, an allocating unit/module, and/or a placing unit/module. The respective units/modules may be hardware, software, or a combination thereof. For instance, one or more of the units/modules may be an integrated circuit, such as field programmable gate arrays (FPGAs) or application-specific integrated circuits (ASICs).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method comprising:
   determining demand for a plurality of communications features of a network, the plurality of communications features comprising a plurality of slices for end-to-end partitions of the network, each slice of the plurality of slices carrying traffic for a different network service of a plurality of network services;
   determining resource allocations for virtual computing instances hosted on a plurality of servers, the virtual computing instances serving the communications features; and
   adjusting the resource allocations for the virtual computing instances hosted on the plurality of servers according to the demand for the communications features and according to a fairness algorithm that is fair to the plurality of network services corresponding to the plurality of slices of the plurality of communications features, wherein the plurality of slices comprise a first slice and a second slice, and wherein the virtual computing instances comprise a first subset of virtual computing instances serving the first slice and a second subset of virtual computing instances serving the second slice, the adjusting comprising:
   after a weight of the first slice increases:
     increasing resources allocated for the first subset of virtual computing instances serving the first slice, and
     decreasing resources allocated for the second subset of virtual computing instances serving the second slice,
   wherein a first sum of the resources allocated for the first subset of virtual computing instances and the resources allocated for the second subset of virtual computing instances before the adjusting equals a second sum of the resources allocated for the first subset of virtual computing instances and the resources allocated for the second subset of virtual computing instances after the adjusting.

2. The method of claim 1, wherein the fairness algorithm is a max-min fairness algorithm.

3. The method of claim 1, wherein the fairness algorithm is an alpha fairness algorithm.

4. The method of claim 1, wherein the fairness algorithm is a proportional fairness algorithm.

5. The method of claim 1, wherein each slice of the plurality of slices having a corresponding weight.

6. The method of claim 5, wherein the virtual computing instances virtualize networking functionality for the network.

7. The method of claim 5, wherein the resource allocations for each of the virtual computing instances are determined for the each slice of the plurality of slices according to:

$$\max \Sigma_s w_s \log(X_s), \text{ and}$$

$$\Sigma_{s \in j} X_s \leq C_j,$$

wherein $X_s$ indicates the resource allocations for the each slice of the plurality of slices, $w_s$ is the corresponding weight of the each slice of the plurality of slices, and $C_j$ is the capacity of the server hosting the computing instance.

8. The method of claim 1, further comprising:
   determining weights for the plurality of slices, wherein the resource allocations for the virtual computing instances are further adjusted according to the weights of the plurality of slices.

9. The method of claim 8, further comprising:
   adjusting the weights of the plurality of slices according to placement of the plurality of slices on the servers.

10. The method of claim 9, wherein the adjusting the resource allocations for the virtual computing instances further comprises:
    optimizing the resource allocations for each of the servers.

11. A device comprising:
    a processor; and
    a non-transitory computer readable storage medium storing programming for execution by the processor, the programming including instructions for:
    determining demand for a plurality of communications features of a network, the plurality of communications features comprising a plurality of slices for end-to-end partitions of the network, and each slice of the plurality of slices carrying traffic for a different network service of a plurality of network services;
    determining resource allocations for virtual computing instances hosted on a plurality of servers, the virtual computing instances serving the communications features; and
    adjusting the resource allocations for the virtual computing instances hosted on the plurality of servers according to the demand for the communications features and according to a fairness algorithm that is fair to the plurality of network services corresponding to the plurality of slices of the plurality of communications features, wherein the plurality of slices comprise a first slice and a second slice, and wherein the virtual computing instances comprise a first subset of virtual computing instances serving the first slice and a second subset of virtual computing instances serving the second slice, the adjusting comprising:
    after a weight of the first slice increases:
      increasing resources allocated for the first subset of virtual computing instances serving the first slice, and
      decreasing resources allocated for the second subset of virtual computing instances serving the second slice,
    wherein a first sum of the resources allocated for the first subset of virtual computing instances and the resources allocated for the second subset of virtual computing instances before the adjusting equals a second sum of the resources allocated for the first subset of virtual computing instances and the resources allocated for the second subset of virtual computing instances after the adjusting.

12. The device of claim 11, wherein the fairness algorithm is a max-min fairness algorithm.

13. The device of claim 11, wherein the fairness algorithm is an alpha fairness algorithm.

14. The device of claim 11, wherein the fairness algorithm is a proportional fairness algorithm.

15. The device of claim 11, wherein each slice of the plurality of slices having a corresponding weight.

16. The device of claim 15, wherein the virtual computing instances virtualize networking functionality for the network.

17. The device of claim 15, wherein the resource allocations for each of the virtual computing instances are determined for the each slice of the plurality of slices according to:

$$\max \Sigma_s w_s \log(X_s), \text{ and}$$

$$\Sigma_{s \in j} X_s \leq C_j,$$

wherein $X_s$ indicates the resource allocations for the each slice of the plurality of slices, $w_s$ is the corresponding weight of the each slice of the plurality of slices, and $C_j$ is the capacity of the server hosting the computing instance.

18. The device of claim 11, wherein the programming includes further instructions for:
determining weights for the plurality of slices, wherein the resource allocations for the virtual computing instances are further adjusted according to the weights of the plurality of slices.

19. The device of claim 18, wherein the programming includes further instructions for:
adjusting the weights of the plurality of slices according to placement of the plurality of slices on the servers.

20. The device of claim 19, wherein the adjusting the resource allocations for the virtual computing instances further comprises:
optimizing the resource allocations for each of the servers.

21. A method comprising:
determining parameters for a plurality of slices of a network, the plurality of slices being logical end-to-end partitions of the network, each slice of the plurality of slices carrying traffic for a different network service of a plurality of network services;
placing the plurality of slices on a plurality of servers, each of the servers having a plurality of virtual computing instances, each of the plurality of virtual computing instances assigned to one of the plurality of slices, wherein the plurality of slices comprise a first slice and a second slice, and wherein the plurality of virtual computing instances comprise a first subset of virtual computing instances serving the first slice and a second subset of virtual computing instances serving the second slice;
allocating resources for the plurality of virtual computing instances according to the parameters and according to a scheme that is fair to the plurality of network services corresponding to the plurality of slices; and
after a weight of the first slice increases, adjusting the allocated resources by:
increasing resources allocated for the first subset of virtual computing instances serving the first slice, and
decreasing resources allocated for the second subset of virtual computing instances serving the second slice,
wherein a first sum of the resources allocated for the first subset of virtual computing instances and the resources allocated for the second subset of virtual computing instances before the adjusting equals a second sum of the resources allocated for the first subset of virtual computing instances and the resources allocated for the second subset of virtual computing instances after the adjusting.

22. The method of claim 21, wherein the parameters comprise a first delay requirement for the first slice of the plurality of slices and a second delay requirement for the second slice of the plurality of slices, and the allocating comprises allocating the resources for the virtual computing instances according to the parameters including the first delay requirement for the first slice and the second delay requirement for the second slice.

23. A device comprising:
a processor; and
a non-transitory computer readable storage medium storing programming for execution by the processor, the programming including instructions for:
determining parameters for a plurality of slices of a network, the plurality of slices being logical end-to-end partitions of the network, each slice of the plurality of slices carrying traffic for a different network service of a plurality of network services;
placing the plurality of slices on a plurality of servers, each of the servers having a plurality of virtual computing instances, each of the plurality of virtual computing instances assigned to one of the plurality of slices, wherein the plurality of slices comprise a first slice and a second slice, and wherein the plurality of virtual computing instances comprise a first subset of virtual computing instances serving the first slice and a second subset of virtual computing instances serving the second slice;
allocating resources for the plurality of virtual computing instances according to the parameters and according to a scheme that is fair to the plurality of network services corresponding to the plurality of slices; and
after a weight of the first slice increases, adjusting the allocated resources by:
increasing resources allocated for the first subset of virtual computing instances serving the first slice, and
decreasing resources allocated for the second subset of virtual computing instances serving the second slice,
wherein a first sum of the resources allocated for the first subset of virtual computing instances and the resources allocated for the second subset of virtual computing instances before the adjusting equals a second sum of the resources allocated for the first subset of virtual computing instances and the resources allocated for the second subset of virtual computing instances after the adjusting.

* * * * *